Nov. 28, 1944.   R. C. PALMER   2,363,743
WELDED PIPE BEAD ELIMINATOR
Filed July 23, 1942
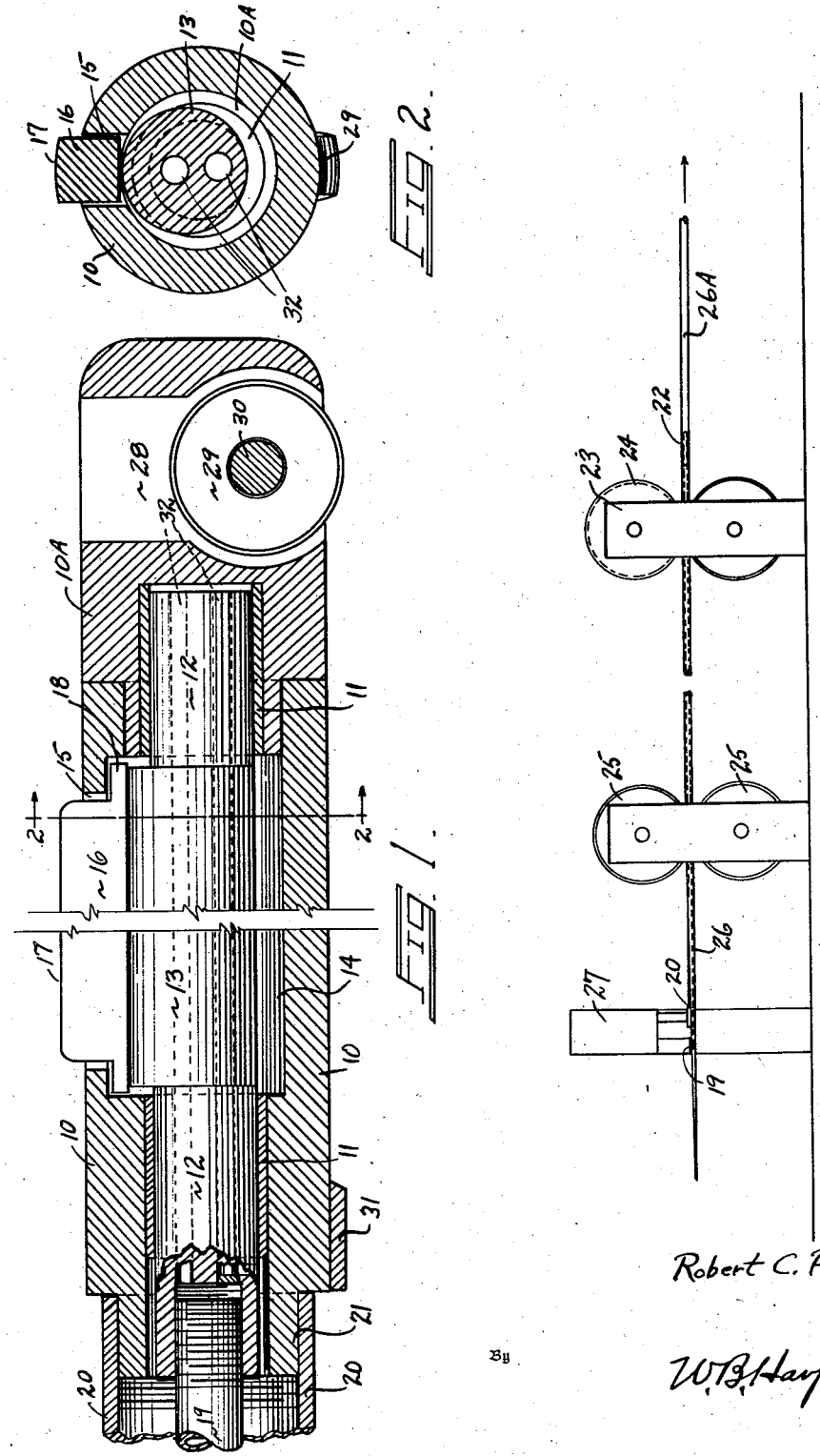
Robert C. Palmer
Inventor
By W. B. Harpman
Attorney Patented Nov. 28, 1944

2,363,743

UNITED STATES PATENT OFFICE 2,363,743

WELDED PIPE BEAD ELIMINATOR

Robert C. Palmer, Youngstown, Ohio

Application July 23, 1942, Serial No. 452,114

3 Claims. (Cl. 78—38)

This invention relates to a device for flattening the internal bead formed in butt weld pipe.

The principal object of this invention is to provide bead eliminator for butt weld pipe capable of operating within the newly welded pipe and applying a hammering action against the newly formed bead thereby flattening the same and smoothing the interior of the pipe.

A further object of the invention is the provision of a bead eliminator for a welded pipe capable of operating in the smallest or largest sizes of welded pipe and to operate therein suitably flattening the bead formed therein in welding.

A further object of the invention is the provision of a bead eliminator adapted to be positioned within newly welded pipe immediately adjacent the welding operation location and so designed as to permit the newly formed pipe to pass continuously thereabout.

A still further object of the invention is the provision of a bead eliminator for use in the interior of a newly formed pipe and provided with suitable channels for the reception and circulation of a cooling agent.

The device of the invention, comprising a bead eliminator for welded pipe, has been designed to facilitate the removal of the bead normally formed on the inside of a pipe by the closure of the seam cleft of the pipe by the welding operation. It is well known that in electrical butt welding of pipe a skelp or strip of metal is preshaped to the desired size by a series of shaping rolls and then passed through a welding stand wherein revolving electrodes pass an electrical current through the opposing edges of the seam cleft of the pipe while at the same time the seam cleft edges are brought together and thus welded by the electrical current creating heat due to the resistance of the pipe metal. As the seam cleft of the pipe is forcefully pressed together, the fluid metal bulges inwardly and outwardly and forms axially extending ridges on both the interior and exterior of the pipe. The device of the invention contemplates the removal of the interior bead and achieves its purpose by subjecting the newly formed bead, while the metal is still plastic, to a hammering action by a rapidly reciprocating hammer which is driven by a simple cam and roller mechanism forming a part of the invention. In forming conduit, which in use will enclose wires and cables, it is very desirable that a smooth interior surface be formed, in various mechanical pipe it is equally desirable that a smooth interior surface be formed as irregularities increase the resistance to the flow of various materials through the pipe thereby necessitating the use of larger diameter of pipe than would otherwise be necessary.

With the foregoing and other objects in view which will appear as the description proceeds, the invention resides in the combination and arrangement of parts and in the details of construction hereinafter described and claimed, it being understood that changes in the precise embodiment of the invention herein disclosed, can be made within the scope of what is claimed without departing from the spirit of the invention.

The invention is illustrated in the accompanying drawing, wherein:

Figure 1 is a cross sectional side elevation with parts broken away illustrating the device of the invention.

Figure 2 is a cross sectional elevation taken on lines 2—2 of Figure 1.

Figure 3 is a diagrammatic side elevation of a stand of shaping rolls and a stand of welding electrodes and illustrates the application of the device of the invention to the pipe being formed and welded thereby.

By referring now to the drawing and Figures 1 and 2 in particular, it will be observed that the bead eliminator comprises a body member 10 tubular in shape, formed in a size permitting it to be inserted into a pipe and operated while located therein. Positioned within body member 10 on bushings 11 there is a cam shaft 12, the cam portion thereof being indicated by the numeral 13. The body member 10 is provided with an enlarged area 14 therein in order to permit the cam 13 on the cam shaft 12 to revolve. A slot-like opening 15 is formed centrally in the body member 10 and in the uppermost surface thereof and is adapted to receive therethrough a hammer member 16 which has a bead engaging surface 17 and is provided at its ends with flanges 18 extending beyond the main portion thereof. The flanges 18 are adapted to underlie portions of the body member 10 which surround the slot 15. The hammer member 16 is adapted to ride upon the cam 13 so that at such times as the cam shaft is revolved as by means of a tubular shaft 19 connected thereto, the hammer member 16 is reciprocated in and out of the slot 15 and thus engages with considerable force the bead on the newly formed pipe passing over the device. In order that the device itself, that is the body member 10 and the hammer 16, may be held in desirable position within moving pipe, a guide member comprising a tube 20 is affixed to an end 21 of the body member 10, preferably threadably engaging the same, the tube 20 thus enclosing the tubular shaft 19 which forms the actual drive shaft. The tube 20 and the tubular shaft 19 therein being positioned within the newly formed pipe, passing through the welding stands and the last shaping stands and emerging from the wide seam cleft of the partly formed pipe back of the shaping stands.

By referring to Figure 3 of the drawing, a diagrammatic illustration of the positioning of the device of the invention with respect to a representation of a pipe mill may be seen. In Figure 3 the device of the invention comprising the body member 10 and its associated parts is located within the newly formed pipe at approximately the location indicated by the numeral 22 which, as has been stated, is in the area just beyond the welding stand which is indicated by the numeral 23, the electrodes being indicated by the numeral 24. The guide pipe 20 and tubular drive shaft 19 pass within the newly formed pipe beneath the electrodes 24 and also pass through the last stand of shaping rolls indicated by the numeral 25. The guide pipe 20 and tubular drive shaft 19 lying within the partly formed pipe indicated by the numeral 26 and terminating in a power and adjusting unit 27. The unit 27 is adapted to rapidly rotate the tubular drive shaft 19 and to suitably hold, in an adjustable manner, the guide pipe 20.

It will thus be seen that while the motivating apparatus essential is placed at a considerable distance from the actual point of operation, the operating zone of the bead eliminator is relatively close to the welding stand, the welded pipe passing over the device being indicated by the numeral 26A.

By again referring to Figures 1 and 2 of the drawing, it will be observed that the body member 10 is closed at its forward end by means of a secondary body member 10A which in turn carries one of the bushings 11 and in connection with body member 10 supports the forward end of the cam shaft 12. In advance of the bearing housing the body member 10A is provided with a hollow section 28 in which a wheel 29 is located by means of transversely positioned shaft 30. The wheel 29 serves to suitably support the forward end of the device of the invention within the moving pipe. Provided for the same purpose of adequately supporting the device within the pipe, there is a skid member 31 formed on the rear most section which may or may not be formed integrally with the body member 10 as desired.

Still referring to Figures 1 and 2 of the drawing, it will be observed that the cam shaft 12 is provided with integrally formed cooling channels 32 through which a cooling agent may be circulated, the cooling agent entering through the tubular drive shaft 19 and leaving through the guide pipe 20.

It will thus be observed that newly formed pipe, the weld area of which is still plastic, passing over the device of the invention while the same is being powered by the power unit 27, will be subjected to the rapidly reciprocating hammer 16 which will suitably flatten and smooth out the interior bead left by the welding operation. It is obvious that if desirable, a back-up roll or shoe may be provided immediately above the pipe passing over the device of the invention so that the action of the hammer 16 may be exerted against a suitable back-up member. The device is simply formed, and therefore economic in manufacture. It is obvious that separate and distinct bead eliminators are necessary for treating the interior of various size pipe.

What I claim is:

1. In an internal bead eliminator comprising a body member adapted to be positioned in newly formed pipe, an axially extending slot formed in said body member, an elongated hammer member positioned in the said slot in the body member and capable of movement with respect thereto so as to engage the said internal bead, means for imparting movement to the said elongated hammer member, said means comprising a shaft positioned in the said body member, an elongated cam formed on said shaft, means for holding the said body in operative position within the said newly formed pipe, and means extending away from the said device and connected to a power unit so that the shaft may be rotated thereby.

2. A bead eliminator comprising a body member tubular in form adapted to be positioned within newly formed pipe so as to permit the said pipe to pass thereover, an elongated slot in the said body member, an elongated hammer member positioned in the said slot in the said body member and adapted to move outwardly from the said body member so as to engage the said bead, means for imparting movement to the said hammer member, said means comprising a cam shaft rotatably positioned in the said body member, means for holding the said body member in operative position within the said newly formed pipe, and means for rotating the said cam shaft so as to cause the said elongated hammer member to move alternately inwardly and outwardly of the said body member.

3. Means for flattening the internal bead of welded pipe comprising a tubular body member having a shaft rotatably positioned therein, an enlarged area formed in said body member, an off-center enlarged cam-like section formed on said shaft and located within said enlarged area, a slot in the said body member, an elongated hammer member positioned in the said slot and adapted to be moved by the said off-center enlarged cam-like section formed on the said shaft, means for positioning the said body member within the newly formed pipe, wheels positioned in the said body member adapted to support the same with respect to the said pipe, and means for rotating the said shaft so as to move the hammer alternately in and out of the said slot and against the bead.

ROBERT C. PALMER.